July 25, 1967 D. LOEV 3,333,255
HIGH SPEED MAGNETIC SHIFT REGISTER
Filed April 4, 1963

INVENTOR.
DAVID LOEV
BY Charles S. Hall

United States Patent Office 3,333,255
Patented July 25, 1967

3,333,255

HIGH SPEED MAGNETIC SHIFT REGISTER

David Loev, Plymouth Meeting, Pa., assignor to Burroughs Corporation, Detroit, Mich., a corporation of Michigan Filed Apr. 4, 1963, Ser. No. 270,641
7 Claims. (Cl. 340—174)

ABSTRACT OF THE DISCLOSURE

A magnetic shift register for use in the parallel to serial conversion of binary information in which two magnetic core subregisters are interconnected through an OR gate so that an output pulse can be obtained with each pulse from the shift pulse source, thereby doubling the shifting speed over that of a conventional shift register of equal capacity.

Figure 1:
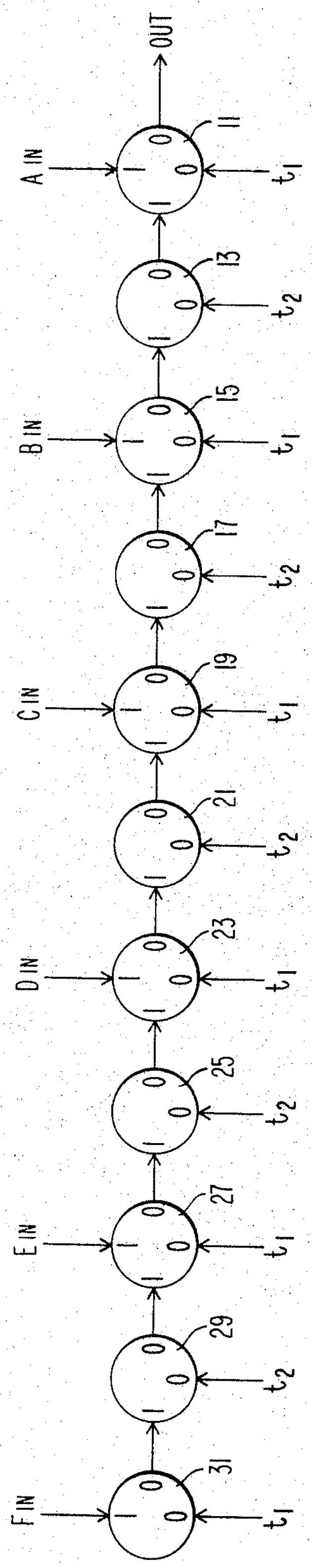
PRIOR ART Fig. 1

This invention relates to magnetic shift registers and particularly to high speed magnetic shift registers for use in parallel to serial conversion.

In the conventional magnetic core shift register, information bits are fed into the storage cores. The bits are then shifted through the register and read serially at the output. Each storage core must be cleared before a subsequent bit of information can be read into it. A delay must, therefore, be provided between each successive two storage cores to permit the complete readout of each information bit before the next information bit is shifted into the storage core. It is now common practice to interpose an additional magnetic core between successive storage cores, these additional cores acting as idler cores and providing the necessary delay.

In operating the conventional magnetic core shift register as a parallel to serial converter, the bits of information are fed in parallel into each of the storage cores. The first bit is fed into the storage core adjacent the output and the second and all subsequent bits are fed in sequence into storage cores further removed from the output.

To read out the information bits from a conventional register, whether used for serial read-in to serial read-out or parallel read-in to serial read-out, the storage cores and idler cores are pulsed alternately. A suitable clock pulse source is used to provide the shifting pulses. The first pulse reads out the first bit and advances all subsequent bits into the adjacent idler cores. The idler cores are then pulsed advancing the information bits into the storage cores. A third pulse is now required to read out the second bit of information from its storage core. Output can be obtained from the conventional magnetic shift register only with every other pulse. A delay is involved due to the necessity of having to pulse the idler cores between successive storage core pulses.

It is an object of the present invention to increase the shifting speed of a magnetic shift register.

It is a further object of the invention to read an information bit out of a magnetic shift register with each driving pulse.

It is a feature of the present invention that, although used particularly for parallel to serial conversion, the number of cores in the magnetic shift register is reduced below two cores per bit of information.

In the high speed magnetic shift register of the present invention, two subregisters, each with alternating storage cores and idler cores in series, the first core of each subregister being a storage core, are connected so that the output of each subregister feeds a common OR gate. The bits of information to be stored are fed in parallel alternately to the subregisters, that is, the first bit is fed into the first storage core of one subregister, and the second bit is fed into the first storage core of the second subregister. All subsequent bits of information are fed into the registers in the same manner. The driving pulses are applied so that with each pulse the storage cores of one subregister and the idler cores of the other subregister are switched simultaneously. Using this pulsing technique, an output will occur with each pulse, rather than every other pulse, thereby substantially doubling the shift speed.

Figure 2:
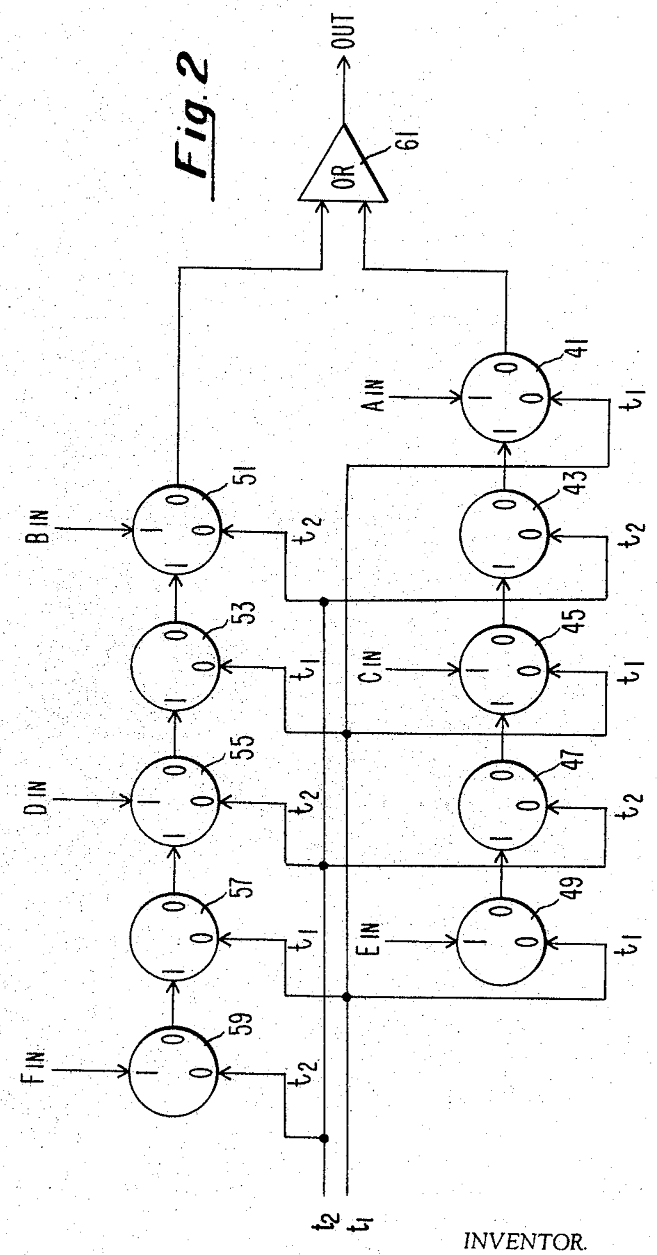

Operation of a magnetic shift register in accordance with this principle is discussed in more detail with reference to the accompanying drawings, in which:

FIG. 1 is a logical block diagram of a magnetic core shift register, previously known in the art with particular reference to parallel to serial conversion, and FIG. 2 is a logical block diagram of the high speed magnetic core shift register of the present invention with particular reference to parallel to serial conversion.

In each figure of the drawings a circle is used to indicate a magnetic core, with input leads and output leads being designated, respectively, by arrows entering and leaving the circle. The storage states into which the input pulses drive the cores are designated by the binary notation at the end of the input leads. In similar manner the binary notation at the output lead indicates that an output signal will occur when the state of the core is changed from the opposite binary state to that indicated. If more detailed information concerning this symbolism is desired, reference may be made to Chapter 10 of the book published in 1960 by John Riley and Sons, Inc., entitled Digital Applications of Magnetic Devices, edited by Albert J. Meyerhoff.

In the prior art magnetic shift register shown in FIG. 1, six storage cores 11, 15, 19, 23, 27, and 31 are connected alternately and serially with idler cores 13, 17, 21, 25, and 29. The information bits to be fed into the register, A through F, are fed in parallel into the storage cores. Bit A is fed into storage core 11 adjacent the output and each successive information bit is fed, in order, into the remaining storage cores. Current pulses from a suitable source, not shown, are fed alternately to the storage and idler cores at time $t_1$ and $t_2$, respectively. At time $t_1$ bit A is shifted out of the register and bits B through F are advanced toward the output of the register into the adjacent idler cores. At time $t_2$ the information bits B through F are again advanced toward the output into the storage cores. Bit B is now in core 11. When a third pulse is applied at time $t_1$, the bit B is shifted out of the register and the remaining bits C through F are again advanced toward the output into the adjacent idler cores. Readout can be had from the magnetic shift register only when core 11 has a bit stored therein and only with a current pulse at time $t_1$. The current pulse at time $t_2$ serves only to advance the information bits out of the idler cores into the storage cores. No output, therefore, can be had at time $t_2$. The necessity of having to separately pulse the idler cores between each readout pulse places a serious time delay on the conventional shift register.

An embodiment of the magnetic shift register of the present invention is shown in FIG. 2. The register illustrated has the same total capacity as the prior art register shown in FIG. 1. The register of the present invention, however, is made up of two subregisters. The first subregister is represented by storage cores 41, 45, and 49 and idler cores 43 and 47. The second subregister is represented by storage cores 51, 55, and 59 and idler cores 53 and 57. The two subregisters feed their respective outputs to an OR gate 61.

A clock pulse or driving pulse source, not shown, is used to provide the current pulses to each core to shift the bits of information. The output of the clock pulse source at times $t_1$ and $t_2$ is applied to each subregister.

At time $t_1$ the clock pulse source delivers a current pulse to the storage cores of the first subregister and the idler cores of the second subregister. At time $t_2$ the clock pulse source delivers a current pulse to the storage cores of the second subregister and the idler cores of the first subregister. The current pulses are continuously alternated between the subregisters in this manner.

In the operation of the magnetic shift register of the present invention, the respective information bits are fed in parallel into the storage cores. Information bit A is fed into the first storage core 41 of the first subregister and information bit B is fed into the first storage core 51 of the second subregister. Remaining information bits C through F are fed in the same order into the storage cores of the first and second subregisters alternately. When it is desired to read the information out of the magnetic shift register, the source of current pulses, not shown, delivers pulses to the subregisters at times $t_1$ and $t_2$. At time $t_1$ the storage cores of the first subregister and the idler cores of the second subregister are driven by a current pulse. This pulse reads out information bit A in core 41 and advances information bits C and E from storage cores 45 and 49 to idler cores 43 and 47, respectively. Idler cores 53 and 57 in the second subregister having no information bits stored therein are not affected by the current pulse at the original time $t_1$. At time $t_2$ the storage cores of the second subregister and the idler cores of the first subregister are driven by a current pulse. This pulse reads out information bit B in core 51 and advances information bits D and F from storage cores 55 and 59 into idler cores 53 and 57. Information bits C and E are also advanced from their respective idler cores 43 and 47 into storage cores 41 and 45. At the next pulse at time $t_1$ idler cores 53 and 57 will contain information, which will be shifted forward to storage cores, while core 41 is being read out and the information in storage core 45 is being shifted into idler core 43.

It can now be seen that with each current pulse at times $t_1$ and $t_2$ an information bit can be read out of storage core 41 or 51, thereby doubling the readout speed of the register of the present invention over the conventional prior art register.

A saving in the number of cores for a shift register of equal capacity to a prior art register is obtained with the magnetic shift register of the present invention. The advantage of using fewer cores permits a smaller more economical magnetic shift register to be utilized. Another advantage of the shift register of the present invention is that it can be readily substituted into a data processing system without requiring replacement or modification of the master clock pulse source. The original pulse source and timing sequence can be used while doubling the shifting and read out rate of the parallel to serial converter.

Although the preferred embodiment of applicant's invention is for use in a parallel to serial converter, it is obvious that the two subregisters of applicant's shift register can be used for serial input and serial read out. In this embodiment information bits would always be fed alternately into the storage cores farthest from the output. By simultaneously pulsing the storage cores of one register and the idler cores of the other register in alternating sequence, in accordance with applicant's invention, the information bits will be shifted toward the output and read out serially. After the information has been advanced to the cores nearest the output, read out will occur at every pulse time.

Those features of the invention which are believed to distinguish the novel aspects thereof are set out with particularity in the appended claims.

Likewise, although the description of the subregisters has been in terms of magnetic cores, it is understood that the storage and idler devices may be any appropriate bistable storage element.

I claim:

1. A high speed magnetic shift register for use in the parallel to serial conversion of binary information comprising a first subregister and a second subregister each having alternately and serially connected storage cores and idler cores, parallel input means to each storage core for entering the information bits into said subregisters alternately, driving means for applying pulses to each core for shifting said information bits through each subregister, logic means whereby the outputs of said subregisters are combined and read out serially, said storage and idler cores being arranged within each subregister so that the driving means will cause a bit of information to advance to the logic means from the first subregister by a pulse at a first period of time and then from the second subregister by the next driving pulse at a second period of time in alternating sequence.

2. A high speed parallel to serial converter comprising a first subregister having alternate storage cores and idler cores serially connected, a second subregister having alternate storage cores and idler cores serially connected, parallel logic input means to the storage cores of each subregister for alternately entering binary information, parallel driving means for applying pulses to each storage core and idler core to shift the binary information through the subregisters, logic gating means for receiving the output of each subregister and combining said outputs, said storage and idler cores being arranged within each subregister so that the driving means will cause a bit of information to advance to the logic gating means from the first subregister by a pulse at a first period of time and then from the second subregister by the next driving pulse at a second period of time in alternating sequence.

3. The high speed parallel to serial converter of claim 2 wherein said parallel driving means at said first period of time provides a pulse to the storage cores of said first subregister and the idler cores of said second subregister and at said second period of time provides a pulse to the storage cores of said second subregister and the idler cores of said first subregister.

4. A high speed magnetic core parallel to serial converter comprising a first subregister having alternate storage cores and idler cores serially connected, a second subregister having alternate storage cores and idler cores serially connected, parallel logic input means to the storage cores of each subregister whereby the first bit of binary information to be stored is read into the first storage core of said first subregister and the second binary bit of information to be stored is read into the first storage core of the second subregister, each succeeding bit of information to be stored being read into the subregisters alternately, parallel driving means for applying current pulses to said storage cores and idler cores to shift the binary information through the subregisters, logic gating means for receiving the output of each subregister and combining said outputs, said storage and idler cores being arranged within each subregister so that the driving means will cause a bit of information to advance to the logic gating means from the first subregister by a pulse at a first period of time and then from the second subregister by the next driving pulse at a second period of time in alternating sequence.

5. A high speed magnetic shift register for use in the parallel to serial conversion of binary information comprising a first subregister having alternate storage cores and idler cores serially connected, a second subregister having alternate storage cores and idler cores serially connected, parallel logic input means to the storage cores of each subregister whereby the first bit of binary information to be stored is read into the first storage core of said first subregister and the second binary bit of information to be stored is read into the first storage core of said second subregister, each succeeding bit of information to be stored being read into the subregisters in the same sequence, parallel driving means for each core for supplying current pulses to shift the binary information through each subregister, said driving means at a first period of time providing a current pulse to the storage cores of said first subregister and the idler cores of said second subregister and at a second period of time providing a current pulse to the storage cores of said second subregister and the idler cores of said first register, said storage and idler cores being arranged within each subregister so that the driving means will cause a bit of information to advance to an output receiving device from the first subregister by a pulse at said first period of time and then from the second subregister by the next driving pulse at said second period of time in alternating sequence.

6. A high speed informational shift register comprising a first subregister having alternate storage and idler bistable elements serially connected, a second subregister having alternate storage and idler bistable elements serially connected, parallel input means for entering binary bits of information in alternating fashion into said respective storage elements of said first and second subregisters, shift pulse means for alternately providing a shift current pulse simultaneously to the storage elements of said first subregister and the idler elements of said second subregister at a first period of time and at a second period of time to the storage elements of said second subregister and the idler elements of said first subregister, logic mixing means for alternately receiving the serial output of each subrdegister in response to each of said shift current pulses said storage and idler bistable elements being arranged within each subregister so that the driving means will cause a bit of information to advance to the logic mixing means from the first subregister by a pulse at a first period of time and then from the second subregister by the next driving pulse at a second period of time in alternating sequence.

7. A high speed informational shift register comprising, in combination, a first subregister having alternate storage and idler bistable elements serially connected and further having an output at one end thereof, a second subregister having alternate storage and idler bistable elements serially connected and further having an output at one end thereof, parallel input means to the storage elements of each of said subregisters, shift pulse means for alternately providing a shift current pulse simultaneously to the storage elements of said first subregister and to the idler elements of said second subregister at a first period of time and at a second period of time to the storage elements of said second subregister and to the idler elements of said first subregister, the shift current pulses changing the bistable elements from one state to the other and causing the information bits represented by these two different states to be shifted toward the output of each subregister, and means for connecting the outputs of the two subregisters to a pulse receiving device and operable to transmit thereto an output pulse representative of a binary bit of information simultaneously as each shift current pulse is applied to the elements of the two subregisters.

References Cited

UNITED STATES PATENTS

| | | | |
|---|---|---|---|
| 2,844,815 | 7/1958 | Winick ------------ | 340—174 |
| 2,938,078 | 5/1960 | Canfora ----------- | 340—347 |
| 3,160,862 | 12/1964 | Adams ------------ | 340—174 |

BERNARD KONICK, *Primary Examiner.*

M. S. GITTES, *Assistant Examiners.*